(12) United States Patent
Bhatia et al.

(10) Patent No.: US 10,284,418 B2
(45) Date of Patent: *May 7, 2019

(54) NETWORK SWITCH MANAGEMENT VIA EMBEDDED MANAGEMENT CONTROLLER USING MANAGEMENT INFORMATION BASE (MIB) TO JSON PARSER

(71) Applicant: AMERICAN MEGATRENDS, INC., Norcross, GA (US)

(72) Inventors: Anurag Bhatia, Lilburn, GA (US); Kiran Kumar Ballapalli, Chennai (IN); Yi-Wei Chiu, Taipei (TW); George Hsin, Taipei (TW); Ajay Kumar Gupta, Chennai (IN); Venkatesan Balakrishnan, Chennai (IN)

(73) Assignee: AMERICAN MEGATRENDS, INC., Norcross, GA (US)

( * ) Notice: Subject to any disclaimer, the term of this patent is extended or adjusted under 35 U.S.C. 154(b) by 288 days.

This patent is subject to a terminal disclaimer.

(21) Appl. No.: 15/218,749

(22) Filed: Jul. 25, 2016

(65) Prior Publication Data

US 2018/0026830 A1    Jan. 25, 2018

(51) Int. Cl.
*G06F 15/173* (2006.01)
*H04L 12/24* (2006.01)
(Continued)

(52) U.S. Cl.
CPC ...... *H04L 41/0213* (2013.01); *H04L 41/0226* (2013.01); *H04L 41/0266* (2013.01);
(Continued)

(58) Field of Classification Search
CPC ..... H04L 41/0213; H04L 41/22; H04L 67/02; H04L 67/42
See application file for complete search history.

(56) References Cited

U.S. PATENT DOCUMENTS 5,471,617 A   11/1995   Farrand et al.
7,328,260 B1   2/2008   Muthiyan et al.
(Continued)

OTHER PUBLICATIONS

Michael W. Dixon, Tanya J. McGill, Johan M. Karisson, Using a network simulation to teach the client-server model, ACM SIGCSE Bulletin, v.29 n.3, p. 71-73, Sep. 1997(Year 1997).
(Continued)

*Primary Examiner* — Dhairya A Patel
(74) *Attorney, Agent, or Firm* — Locke Lord LLP; Tim Tingkang Xia, Esq.

(57) ABSTRACT

Certain aspects direct to systems and methods for network switch management via a management controller using a management information base (MIB) to JavaScript Object Notation (JSON) parser. At a computing device, an administrator provides a MIB file corresponding to a network switch to be managed. Then the administrator utilizes a parser application to parse the MIB file at the computing device to retrieve Object Identifiers (OIDs) from the MIB file, and then converts the OIDs to JSON objects, in order to generate parsed information of the MIB file including the JSON objects. Thus, the administrator may use a browser to access a web user interface at a management controller to upload the parsed information of the MIB file to the management controller. The management controller may then manage and configure the network switch through a Simple Network Management Protocol (SNMP) interface based on the parsed information of the MIB file.

17 Claims, 6 Drawing Sheets

(51) Int. Cl.
*H04L 29/08* (2006.01)
*H04L 29/06* (2006.01)

(52) U.S. Cl.
CPC ............ *H04L 67/02* (2013.01); *H04L 67/025* (2013.01); *H04L 67/42* (2013.01); *H04L 41/0253* (2013.01)

(56) References Cited

U.S. PATENT DOCUMENTS

| | | | |
|---|---|---|---|
| 7,401,338 B1 | 7/2008 | Bowen et al. | |
| 7,610,357 B1 | 10/2009 | Chandrachood | |
| 7,739,362 B1 | 6/2010 | Zhang et al. | |
| 7,783,733 B1 | 8/2010 | Yip et al. | |
| 7,885,256 B1 * | 2/2011 | Yenamandra | H04L 67/1097 370/389 |
| 9,491,056 B1 * | 11/2016 | Kulkarni | H04L 41/12 |
| 2002/0001307 A1 | 1/2002 | Nguyen et al. | |
| 2004/0128365 A1 | 7/2004 | Motoyama et al. | |
| 2006/0092827 A1 | 5/2006 | Jain | |
| 2007/0073863 A1 | 3/2007 | Motoyama et al. | |
| 2007/0288558 A1 * | 12/2007 | Land | H04L 12/2856 709/203 |
| 2011/0040896 A1 | 2/2011 | DeCusatis | |
| 2011/0265006 A1 | 10/2011 | Morimura et al. | |
| 2014/0282399 A1 * | 9/2014 | Gorelik | G06F 8/71 717/122 |
| 2014/0371514 A1 | 12/2014 | Bokotey | |
| 2015/0052256 A1 * | 2/2015 | Fenstad | H04L 67/40 709/227 |
| 2015/0081878 A1 * | 3/2015 | Pabba | H04L 41/0806 709/224 |
| 2016/0072761 A1 * | 3/2016 | Shih | H04L 61/2015 709/220 |
| 2016/0261489 A1 | 9/2016 | Knees et al. | |
| 2017/0052978 A1 | 2/2017 | Gupta et al. | |
| 2018/0183796 A1 * | 6/2018 | Smith | H04L 63/10 |

OTHER PUBLICATIONS

Britannica, T.E. (Nov. 23, 2015). Client-server architecture. Retrieved from https://www.brittanica.com/technology/client-server architecture (Year 2015).

* cited by examiner

NETWORK SWITCH MANAGEMENT VIA EMBEDDED MANAGEMENT CONTROLLER USING MANAGEMENT INFORMATION BASE (MIB) TO JSON PARSER

CROSS-REFERENCE TO RELATED PATENT APPLICATION

This application relates to co-pending U.S. patent application Ser. No. 15/218,437, entitled "DEVICE OR VENDOR INDEPENDENT NETWORK SWITCH MANAGEMENT ON EMBEDDED MANAGEMENT CONTROLLER STACK," and U.S. patent application Ser. No. 15/218,573, entitled "INTUITIVE USER INTERFACE (UI) FOR DEVICE OR VENDOR INDEPENDENT NETWORK SWITCH MANAGEMENT VIA EMBEDDED MANAGEMENT CONTROLLER," both filed on Jul. 25, 2016. The entire contents of the above identified applications are incorporated herein by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD

The present disclosure relates generally to network switch management, and more particularly to systems and methods for device or vendor independent network switch management on an embedded management controller stack, such as a baseboard management controller (BMC), a chassis management controller or a rack management controller, using a management information base (MIB) to JavaScript Object Notation (JSON) parser.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Network switches are used to manage the flow of data across a network by transmitting a received message only to the one or more devices for which the message was intended. For example, a network switch may be used to connect multiple devices, and each networked device being connected to the network switch may be identified using a MAC address, allowing the network switch to regulate the flow of traffic.

In the modern world information technology infrastructure, there is a need to manage the network switches. For example, an administrator may remotely connect to the network switch from a remote computer using a client software. Typically, the client software for the network switch may be a standalone application. However, different network switches manufactured by different vendors may have different management software applications, and all of these standalone applications must be installed in every client computer to work.

Therefore, an unaddressed need exists in the art to address the aforementioned deficiencies and inadequacies.

SUMMARY

Certain aspects of the present disclosure direct to a system, which includes a network switch having a Simple Network Management Protocol (SNMP) interface; a management controller communicatively connected to the network switch through the SNMP interface; and a computing device communicatively connected to the management controller through an out-of-band (OOB) network. The computing device includes a processor and a storage device storing computer executable code. The computer executable code, when executed at the processor, is configured to: parse a management information base (MIB) file corresponding to the network switch to retrieve a plurality of Object Identifiers (OIDs) from the MIB file; convert the OIDs to a plurality of JavaScript Object Notation (JSON) objects to generate parsed information of the MIB file comprising the JSON objects; and upload the parsed information of the MIB file to the management controller through the OOB network, wherein the management controller is configured to receive the parsed information of the MIB file, and establish a communication between the management controller and the network switch through the SNMP interface based on the parsed information of the MIB file, wherein the management controller functions as a client of the communication and the network switch functions as a server of the communication.

In certain embodiments, the management controller is a chassis management controller, a baseboard management controller (BMC), or a rack management controller.

In certain embodiments, the computer executable code includes: a parser application configured to: parse the MIB file corresponding to the network switch to retrieve the OIDs from the MIB file; and convert the OIDs to the JSON objects to generate parsed information of the MIB file; and a browser application configured to: request for a web user interface (UI) from the management controller; receive the web UI from the management controller; display the web UI in a browser application; and upload, through the web UI, the parsed information of the MIB file to the management controller.

In certain embodiments, the web UI is in a HTML5 compatible format.

In certain embodiments, the browser application is configured to upload the parsed information of the MIB file to the management controller using a jQuery Ajax function.

In certain embodiments, the management controller is configured to: generate the web UI; in response to receiving the request for the web UI from the remote computing device, send the web UI to the remote computing device; in response to receiving the parsed information of the MIB file being uploaded from the remote computing device, process the parsed information of the MIB file, and display, through the web UI, the processed parsed information of the MIB file in a hierarchical organization; and establish the communication between the management controller and the network switch through the SNMP interface based on the processed parsed information of the MIB file.

In certain embodiments, the browser application is further configured to: receive, through the web UI, an input for managing and configuring the network switch; and send the input to the management controller through the OOB network.

In certain embodiments, the management controller is further configured to: receive the input from the remote computing device through the OOB network; and manage and configure the network switch via the communication through the SNMP interface based on the input and the parsed information of the MIB file.

Certain aspects of the present disclosure direct to a method for network switch management via a management controller using a management information base (MIB) to JavaScript Object Notation (JSON) parser. The method includes: receiving, at a computing device, a MIB file corresponding to a network switch having a Simple Network Management Protocol (SNMP) interface, wherein the management controller is communicatively connected to the network switch through the SNMP interface, and the computing device is communicatively connected to the management controller through an out-of-band (OOB) network; parsing, by a parser application executed at the computing device, the MIB file to retrieve a plurality of Object Identifiers (OIDs) from the MIB file; converting, by the parser application executed at the computing device, the OIDs to a plurality of JSON objects to generate parsed information of the MIB file comprising the JSON objects; and uploading, by the computing device, the parsed information of the MIB file to the management controller through the OOB network, wherein the management controller is configured to receive the parsed information of the MIB file, and establish a communication between the management controller and the network switch through the SNMP interface based on the parsed information of the MIB file, wherein the management controller functions as a client of the communication and the network switch functions as a server of the communication.

In certain embodiments, the management controller is a chassis management controller, a BMC, or a rack management controller.

In certain embodiments, the method further includes: requesting, by a browser application executed at the computing device, for a web user interface (UI) from the management controller; receiving, by the browser application, the web UI from the management controller; and displaying, by the browser application, the web UI in a browser application; wherein the parsed information of the MIB file is uploaded through the web UI displayed by the browser application to the management controller.

In certain embodiments, the web UI is in a HTML5 compatible format.

In certain embodiments, the browser application is configured to upload the parsed information of the MIB file to the management controller using a jQuery Ajax function.

In certain embodiments, the method further includes: receiving, by the browser application through the web UI, an input for managing and configuring the network switch; and sending, by the browser application, the input to the management controller through the OOB network, wherein the management controller is configured to manage and configure the network switch via the communication through the SNMP interface based on the input and the parsed information of the MIB file.

Certain aspects of the present disclosure direct to a non-transitory computer readable medium storing computer executable code. The computer executable code, when executed at a processor of a computing device, is configured to: parse a management information base (MIB) file corresponding to a network switch having a Simple Network Management Protocol (SNMP) interface to retrieve a plurality of Object Identifiers (OIDs) from the MIB file, wherein a management controller is communicatively connected to the network switch through the SNMP interface, and the computing device is communicatively connected to the management controller through an out-of-band (OOB) network; convert the OIDs to a plurality of JavaScript Object Notation (JSON) objects to generate parsed information of the MIB file comprising the JSON objects; and upload the parsed information of the MIB file to the management controller through the OOB network, wherein the management controller is configured to receive the parsed information of the MIB file, and establish a communication between the management controller and the network switch through the SNMP interface based on the parsed information of the MIB file, wherein the management controller functions as a client of the communication and the network switch functions as a server of the communication.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein.

DETAILED DESCRIPTION

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

The present disclosure relates to computer systems applied on BMC simulator. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

As discussed above, different network switches manufactured by different vendors may have different management software applications, and all of these standalone applications must be installed in every client computer to work. Thus, a management controller, such as a chassis management controller responsible for the chassis management, may be used to manage the network switches. This will provide a centralized, out-of-band (OOB) way to the system administrators to manage the complete system.

However, managing network switches from the management controller stack could be tricky, because a corresponding module needs to be developed and supported on the management controller stack for each of the network switches to be supported. Further, supporting all different network switches can be a daunting task using the same management controller stack.

Facing the challenges and limitations, certain aspects of the present disclosure direct to systems and methods for device or vendor independent network switch management on an embedded management controller stack, such as a baseboard management controller (BMC), a chassis management controller or a rack management controller. In certain embodiments, communication between the management controller and the network switch may be performed through a Simple Network Management Protocol (SNMP) interface. SNMP is a popular protocol for network management, which is used for collecting information from, and configuring, network devices. Examples of the network devices may include, without being limited to, servers, printers, hubs, switches, and routers on an Internet Protocol (IP) network. In certain embodiments, a SNMP Agent, which is a software module residing a network device, may be responsible for gathering information about the local system and storing the information in a format that can be queried. The format is the management information base (MIB) format. In particular, MIB is a collection of information for managing network elements. A MIB file includes managed objects identified by the name of Object Identifiers (OIDs). Specifically, an OID is an identifier used to name an object. Each of the OIDs is a unique identifier unique which denotes specific characteristics of a managed device. When queried for, the return value of each OID may be different, e.g., Text, Number, Counter, etc. Generally, an OID may take the form of an implementation-specific integer or pointer that uniquely identifies an object, and is thus a code which is not easily readable by human users. Structurally, an OID includes a node in a hierarchically-assigned namespace, formally defined using the using the ITU-T's ASN.1 standard, X.690. Successive numbers of the nodes, starting at the root of the tree, identify each node in the tree. Designers set up new nodes by registering them under the node's registration authority.

There are two types of managed objects or OIDs: scalar and tabular. A scalar object defines a single object instance. An example of the scalar OID may be a vendor name of a device, and the result can be only one. For example, in a MIB file, the OIDs about the platformName and systemLocation are scalar OIDs. On the other hand, a tabular object defines multiple related object instances that are grouped together in the MIB tables. An example of the tabular OID relates to central processing unit (CPU) utilization of a quad processor, which is a CPU chip having four independent units or cores that read and execute CPU instructions. Since the quad processor has four independent cores, the OID would generate a result for each core separately, meaning that four results will be obtained for the tabular OID related to the quad processor.

Generally, the OIDs are organized hierarchically in the MIB file. In certain embodiments, the MIB hierarchy can be represented in a hierarchical organization or a tree structure with individual variable identifier.

In certain embodiments, the management controller may utilize an existing SNMP client application on Linux to communicate with the network switch through the SNMP interface. To ensure the device/vendor independent support on the management controller, the information of the MIB file corresponding to the network switch must be uploaded to the management controller, such that the information of the MIB file may be used to interpret the data on the management controller to manage and control the network switch. In certain embodiments, the management controller may include a MIB2JSON library, which may be used to convert the OIDs in the MIB file to JavaScript Object Notation (JSON) objects, which is not in the OID format. JSON is an open-standard language-independent format that uses human-readable text to transmit data objects including attribute-value pairs. In other words, each of the JSON objects may include a text message that is readable by human.

For the MIB2JSON library to run properly on the management controller, Node.js support is required to read the supporting MIB files and uploaded MIB file. Node.js is an open-source, cross-platform runtime environment for developing server-side Web applications. Although Node.js is not a JavaScript framework, many of its basic modules are written in JavaScript, and developers can write new modules in JavaScript. The runtime environment interprets JavaScript using Google's V8 JavaScript engine. Thus, the management controller must be installed with the MIB2JSON library and the Node.js server components to convert the MIB file to JSON objects. However, the Node.js server component is a relatively large software component, which exceeds the maximum memory size of a typical management controller. For example, a typical BMC has a 32 MB flash memory, which is not enough for the Node.js server component. Further, in some occasions, for some of the MIB files being converted by the MIB2JSON library, the value of the OIDs may return wrong values during the converting process.

Facing the challenges and limitations, certain aspects of the present disclosure direct to systems and methods for network switch management via a management controller using a MIB to JSON parser in a remote computing device. In certain embodiments, the conversion of the OIDs of the MIB file to JSON objects is performed by a parser application in a remote computing device before being the JSON objects are uploaded to the management controller. In this way, the Node.js server component is no longer needed at the management controller, thus avoiding the memory excess problem of the management controller. The parser application at the remote computing device may be made more generic by adding an additional mechanism to upload the supported MIB files. With this option, any MIB file can be parsed to JSON by uploading its required supported MIB files.

Figure 1:
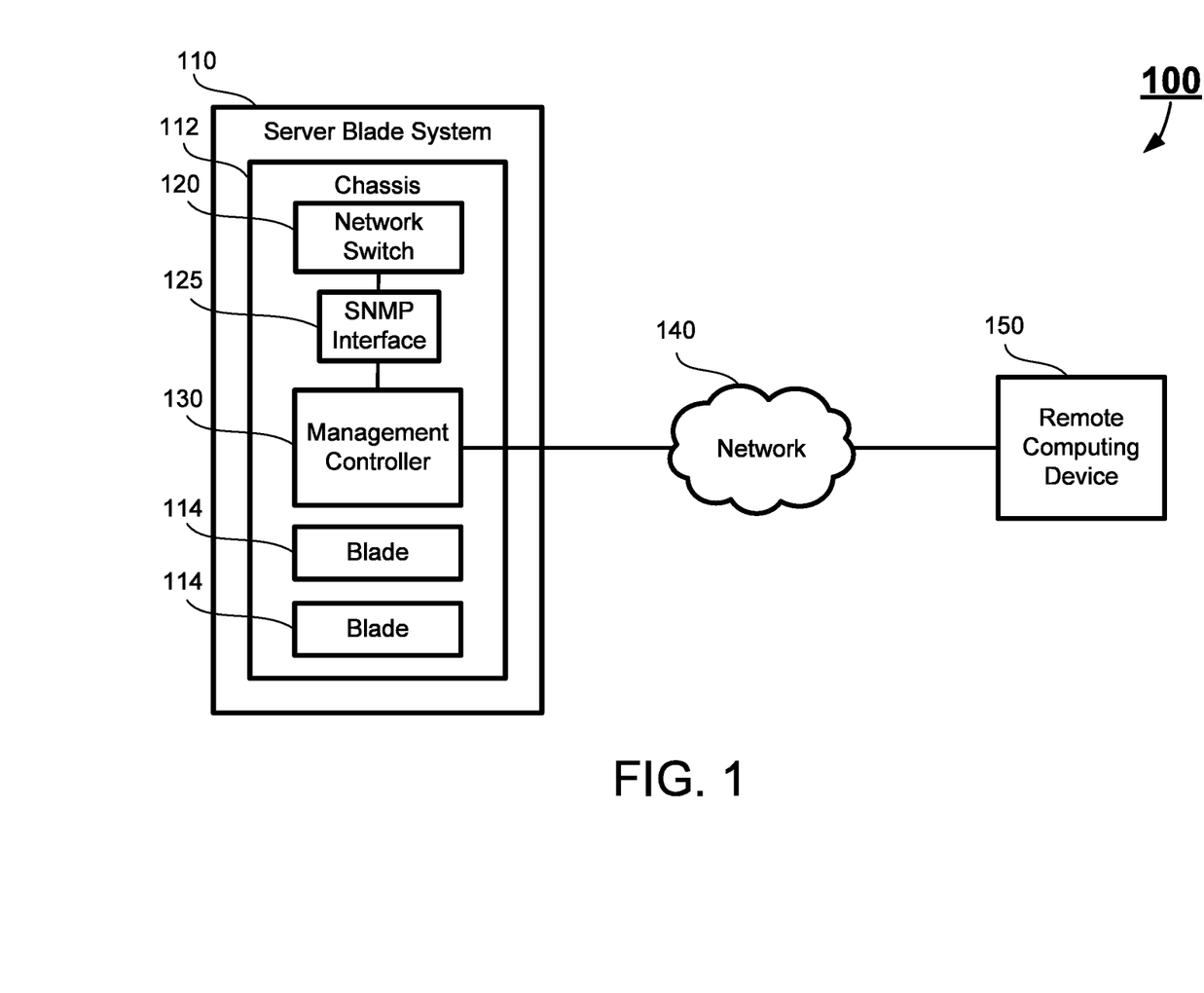
FIG. 1 schematically depicts a system according to certain embodiments of the present disclosure.

FIG. 1 schematically depicts a system according to certain embodiments of the present disclosure. As shown in FIG. 1, the system 100 includes a server blade system 110, which includes a chassis 112 and a plurality of blades 114 mounted on and enclosed by the chassis 112, a network switch 120, and a management controller 130. Further, the system 100 may include a remote computing device 150, which is communicatively connected to the management controller 130 via a network 140. The network 140 is an OOB network for the management controller 130. In certain embodiments, the network 140 may be a wired or wireless network, and may be of various forms. Examples of the network 140 may include, but is not limited to, a local area network (LAN), a wide area network (WAN) including the Internet, or any other type of networks.

The server blade system 110 is a computer system with a modular design, which may be optimized to minimize the use of physical space and energy. The chassis 112 of the server blade system 110 is a supporting enclosure structure, where a plurality of components, including the blades 114 and other components, may be mounted thereon. In certain embodiments, the network switch 120 and the management controller 130 may be mounted within the chassis 112. In certain embodiments, the blades 114 and other components mounted on and enclosed by the chassis 112 may be interconnected by the network switch 120 and managed by the management controller 130. In certain embodiments, each of the blades 114 mounted on and enclosed by the chassis 112 may be a plate with all the functional components to be considered a computer, and the server blade system 110, with all the blades 114 being mounted on the chassis 112, constitutes and functions as a server system as a whole. In certain embodiments, the chassis 112 may include a frame or other internal physical supporting structure on which the blades 114, circuit boards, plates, and other electronics of the server blade system 110 may be mounted. For example, the chassis 112 may include a metal frame.

The network switch 120 is a computer networking device that connects devices, such as the blades 114 of the blade server system 110, together on a computer network. In comparison to less advanced network hubs, which broadcast the data out of each of the ports of the network hubs, the network switch 120 forwards data only to one or multiple destination devices that need to receive it. In certain embodiments, the network switch 120 utilizes packet switching to receive, process and forward data to the destination device. In certain embodiments, the network switch 120 may be a multiport network bridge that uses hardware addresses (such as the MAC addresses) to process and forward data at the data link layer of the Open Systems Interconnection (OSI) model.

In certain embodiments, the network switch 120 includes a SNMP interface. As described above, the information of the network switch 120 may be stored in a corresponding MIB file as the OIDs. Each of the OIDs is unique and denotes specific characteristics of a managed device for the network switch 120. Generally, an OID may take the form of an implementation-specific integer or pointer that uniquely identifies an object, and is thus a code which is not easily readable by human users. In certain embodiments, different network switch 120 provided by different vendors may each have a corresponding MIB file. In order to properly manage the network switch 120, the information of the MIB file needs to be provided to the management controller 130.

In certain embodiments, the system 100 may include multiple network switches 120, and each of the network switches 120 may include a SNMP interface. In these case, each of the network switches 120 may have a corresponding MIB file, and the information of the MIB file corresponding to each of the network switches 120 needs to be provided to the management controller 130.

The management controller 130 is a controller for managing the components of the blade server system 110, including the blades 114, the network switch 120 and other components. In certain embodiments, the management controller 130 may be a chassis management controller for monitor the operation of the components of the chassis 112. In certain embodiments, the management controller 130 may be a baseboard management controller (BMC). In certain embodiments, the management controller 130 may be a controller for other managing purposes, such as a rack management controller, a satellite management controller, or any other types of management controller. In certain embodiments, the system 100 may include multiple management controllers 130, and each of the management controllers 130 may be used to respectively manage some or all of the components of the blade server system 110, including the blades 114, the network switch 120 and other components. To simplify the description, the management controller 130 as described below is a management controller responsible for managing and configuring the network switch 120.

Figure 2:
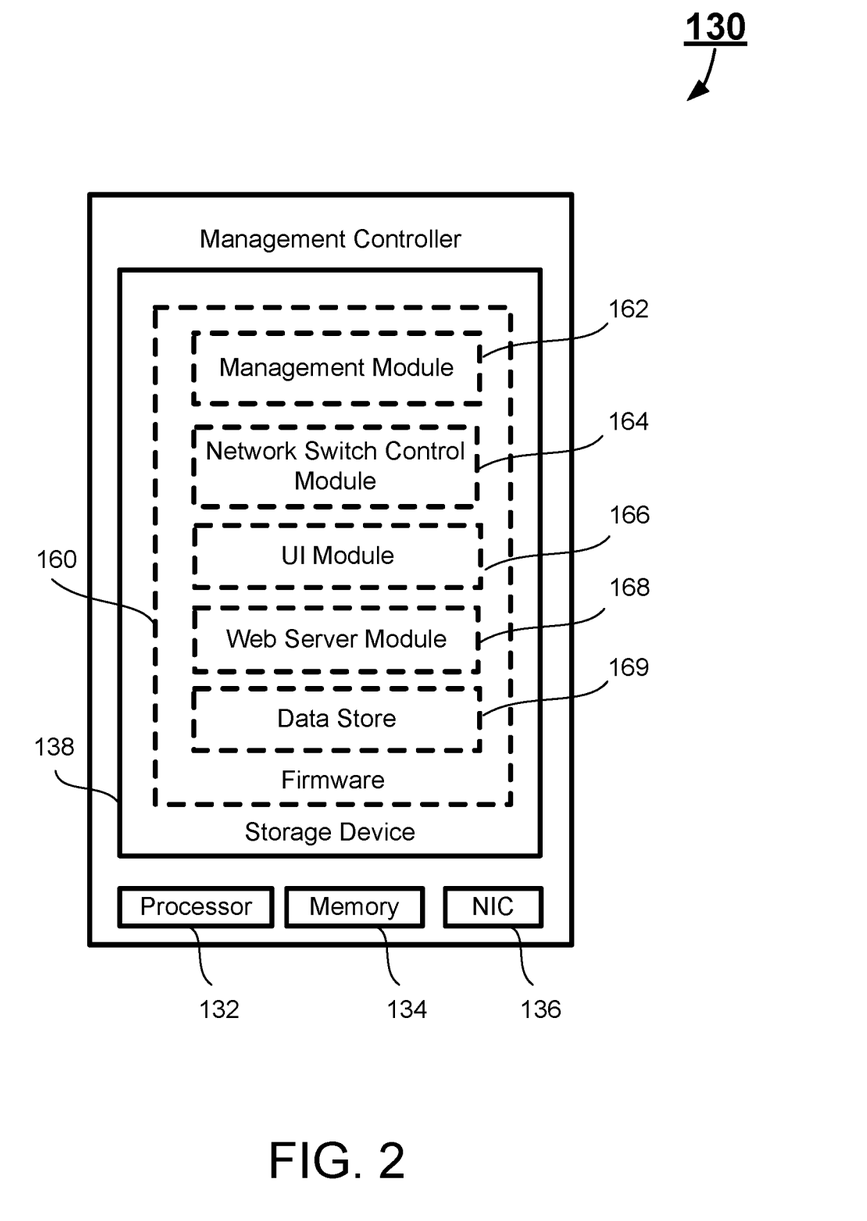
FIG. 2 schematically depicts a management controller of the system according to certain embodiments of the present disclosure.

FIG. 2 schematically depicts a management controller of the system according to certain embodiments of the present disclosure. As shown in FIG. 2, the management controller 130 includes a processor 132, a memory 134, a network interface card (NIC) 136, and a storage device 138. Further, the management controller 130 may include other hardware components and software components (not shown) to perform its corresponding tasks. Examples of these hardware and software components may include, but not limited to, other required memory, interfaces, buses, Input/Output (I/O) modules and peripheral devices.

The processor 132 is configured to control operation of the management controller 130. In certain embodiments, the processor 132 may be a central processing unit (CPU). The processor 132 can execute any computer executable code or instructions, such as the firmware 160 of the management controller 130 or other applications and instructions of the management controller 130. In certain embodiments, the management controller 130 may run on more than one processor, such as two processors, four processors, eight processors, or any suitable number of processors.

The memory 134 can be a volatile memory, such as the random-access memory (RAM), for storing the data and information during the operation of the management controller 130. In certain embodiments, the memory 134 may be a volatile memory array. In certain embodiments, the management controller 130 may run on more than one memory 134.

The NIC 136 is a network interface, which functions as a point of interconnection for the management controller 130 with the remote computing device 150 or any other device through the network 140. In certain embodiments, the NIC 136 may be implemented by hardware and/or software components, and does not necessarily have a physical form. In certain embodiments, the management controller 130 may include more than one NIC 136 to be connectable to multiple different networks.

The storage device 138 is a non-volatile data storage media for storing the applications of the management controller 130. Examples of the storage device 136 may include non-volatile memory such as flash memory, memory cards, USB drives, hard drives, floppy disks, optical drives, or any other types of data storage devices. In certain embodiments, the management controller 130 may have multiple storage devices 138, which may be identical storage devices or different types of storage devices, and the firmware 160 and other applications of the management controller 130 may be stored in one or more of the storage devices 138 of the management controller 130. In certain embodiments, the storage device 138 may store other applications independent from the firmware 160.

The firmware 160 stored in the storage device 138 may include computer executable code or instructions executable at the processor 132, and the computer executable code or instructions may include a plurality of modules to collectively form the firmware 160. As shown in FIG. 2, the modules of the firmware 180 may include, without being limited to: a management module 162, a network switch control module 164, a user interface (UI) module 166, a web server module 168, and a data store 169. In certain embodiments, each of the modules of the firmware 160 may further include sub-modules. Alternatively, in certain embodiments, some or all of the modules of the firmware 180 may be combined to form a single module. It should be particularly noted that the firmware 160 of the management controller does not require any module to perform the conversion of OIDs to JSON objects, such as the MIB2JSON library and/or the Node.js. Thus, the memory space of the storage device 138 may be saved.

The management module 162 is a core module of the firmware 160 for performing management functions of the management controller 130. In certain embodiments, the management module 162 is configured to monitoring the various features of the server blade system 110, such as the chassis 112, the blades 114, and other components of the server blade system 110.

The network switch control module 164 is a module for configuring, managing and controlling the network switch

120 through the SNMP interface based on the configuration data of the network switch 120. In certain embodiments, the configuration data of the network switch 120 includes parsed information of the MIB file corresponding to the network switch 120, and the network switch control module 164 may configure and manage the network switch 120 based on the parsed information of the MIB file. In certain embodiments, the parsed information of the MIB file may include a plurality of JSON objects, which is not in the OID format. In certain embodiments, each of the JSON objects may include a text message that is readable by human about certain information of the network switch 120.

In certain embodiments, the network switch control module 164 may utilize the existing SNMP client codes on Linux to establish a client-server communication with the network switch 120 through the SNMP interface, such that the network switch 120 functions as a server and the management controller 130 functions as a client. When the network switch control module 164 is executed, the network switch control module 164 retrieves the configuration data of the network switch 120 from the data store 169. Based on the configuration data of the network switch 120, the network switch control module 164 may establish the client-server communication with the network switch 120 through the SNMP interface, in which the management controller 130 functions as the client, and the network switch 120 functions as the server. In this way, the network switch control module 164 may then communicate with the network switch 120 through the communication channel via the SNMP interface. In certain embodiments, when the network switch control module 164 receives an input from the UI module 166, the network switch control module 164 may update the configuration data of the network switch stored in the data store based on the input. Further, the network switch control module 164 may generate a command for managing the network switch based on the input, and send the command to the network switch via the communication through the SNMP interface.

The UI module 166 is a module which, when executed at the processor 132, provides a UI for the administrator to control the configuration data of the network switch 120. Specifically, the UI is configured to provide various functionalities, including receiving the parsed information of the MIB file; storing the received parsed information of the MIB file in the data store 169; loading the parsed information of the MIB file from the data store 169; displaying the parsed information of the MIB file in a hierarchical organization (or a tree view), which is similar to a UI of a typical MIB browser application; and receiving an input for the network switch control module 164. In particular, the UI may be implemented and designed as a web page, such as a graphic UI (GUI) under the HTML5 standard, and utilizes instructions such as load, unload, GET, GET NEXT, SET, GET ALL, and other instructions to obtain and display information and status of the network switch 120.

In certain embodiments, the UI module 166 is configured to process the parsed information of the MIB file by converting the JSON objects to the UI display options by arranging the JSON objects in the hierarchical format, such that each of the JSON objects may have a parent (a corresponding object at an upper level) or at least one child (a corresponding object at a lower level). Each of the JSON object form an array with attributes, such as an array of (text, Parent, Gparent), which corresponds to a map text with the object name, a "parent" with the OID, and a "grandparent" (GParent) with the Module name. The array may then be grouped with the parent attribute. The grouped array contains each key, which seems to be parent, and the values are the nodes that need to be pushed into the parent. However, there are some child which may have grandchildren that need to be identified by checking each and every element of the array recursively. The result of the recursive loop needs to be pushed into a single module name, which is initially declared as the GParent. Finally, the processed JSON objects need to be stringified to bind the hierarchical organization (i.e., the tree view) before being stored in the data store 169.

The web server module 168 is a module to provide a web server, which is capable of providing web contents accessible for the remote computing device 150 through the network 140. For example, when the UI module 166 provides the UI, the web server module 168 may generate or create a web page for the UI, such that the UI becomes a web UI, and the administrator may remotely request for the web UI from the remote computing device 150 using a browser application in order to access the web UI (i.e., the web page for the UI). In certain embodiments, the web UI may be in a HTML5 compatible format. HTML5 is the fifth and current version of the HyperText Markup Language (HTML) standard, which is a markup language used for structuring and presenting content on the World Wide Web. In certain embodiments, the web server module 168 may receive a browsing request for the web page from the remote computing device 150. In response to the request for the web page, the web server module 168 may send the web page to the remote computing device 150, such that the web UI is displayable at the browser application 172 of the remote computing device 150. When the administrator at the remote computing device 150 controls the UI to upload the parsed information of the MIB file, or to generate an input, the web server module 168 may receive the uploaded parsed information of the MIB file or the input from the remote computing device 150.

The data store 169 is a database which stores information of the management controller 130. In certain embodiments, the information stored in the data store 169 may include configuration data of the network switch 120, and the parsed information of the MIB file received. In certain embodiments, the parsed information of the MIB file may be a part of the configuration data of the network switch 120. In certain embodiments, the configuration data of the network switch 120 may further include, without being limited to, description information of the network switch 120, an internet protocol (IP) address of the network switch 120, a port number, or any other information related to the network switch 120. In certain embodiments, some of the configuration data of the network switch 120 may be obtained from the parsed information of the MIB file, or may be obtained from the user input through the UI provided by the UI module 166.

The remote computing device 150 is a computing device which may be communicatively connected to the management controller 130 remotely through the network 140. In certain embodiments, the remote computing device 150 may be a general purpose computer, a specialized computer, a server, a mobile device such as a laptop computer, a smartphone or a tablet, or any other types of computing device. In certain embodiments, the system 100 may include multiple remote computing devices 150. In certain embodiments, a user, such as an administrator of the system 100, may operate the remote computing device 150 to communicate with the management controller 130 in order to remotely control the network switch 120.

Figure 3:
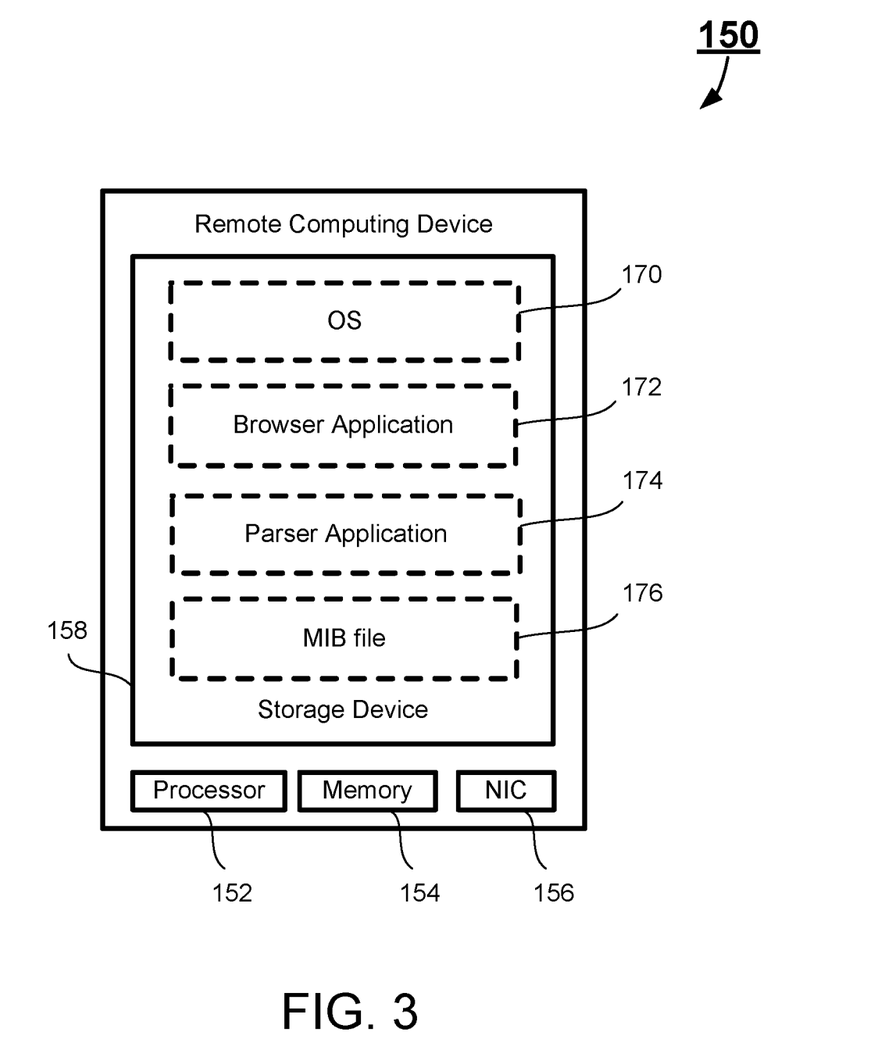
FIG. 3 schematically depicts a remote computing device of the system according to certain embodiments of the present disclosure.

FIG. 3 schematically depicts a remote computing device of the system according to certain embodiments of the present disclosure. As shown in FIG. 3, the remote computing device 150 includes a processor 152, a memory 154, a NIC 156, and a storage device 136. Further, the remote computing device 150 may include other hardware components and software components (not shown) to perform its corresponding tasks. Examples of these hardware and software components may include, but not limited to, other required memory, interfaces, buses, Input/Output (I/O) modules and peripheral devices, such as a display device or other output devices, a keyboard, a mouse, or other input devices for the user to input data.

The processor 152 is configured to control operation of the remote computing device 150. In certain embodiments, the processor 152 may be a central processing unit (CPU). The processor 152 can execute any computer executable code or instructions of the remote computing device 150. In certain embodiments, the remote computing device 150 may run on more than one processor, such as two processors, four processors, eight processors, or any suitable number of processors.

The memory 154 can be a volatile memory, such as the random-access memory (RAM), for storing the data and information during the operation of the remote computing device 150. In certain embodiments, the memory 154 may be a volatile memory array. In certain embodiments, the remote computing device 150 may run on more than one memory 154.

The NIC 156 is a network interface, which functions as a point of interconnection for the remote computing device 150 with the management controller 130 or any other device through the network 140. In certain embodiments, the NIC 156 may be implemented by hardware and/or software components, and does not necessarily have a physical form. In certain embodiments, the remote computing device 150 may include more than one NIC 156 to be connectable to multiple different networks.

The storage device 158 is a non-volatile data storage media for storing the applications of the remote computing device 150. Examples of the storage device 156 may include non-volatile memory such as flash memory, memory cards, USB drives, hard drives, floppy disks, optical drives, or any other types of data storage devices. In certain embodiments, the remote computing device 150 may have multiple storage devices 158, which may be identical storage devices or different types of storage devices, and the applications or software modules of the remote computing device 150 may be stored in one or more of the storage devices 158 of the management controller 130.

The applications stored in the storage device 158 may include computer executable code or instructions executable at the processor 152, and the computer executable code or instructions may include a plurality of software modules to collectively form the one or more of the applications. As shown in FIG. 3, the applications may include, without being limited to: an operating system (OS) 170, a browser application 172, and a parser application 174. Further, a MIB file corresponding to the network switch 120 is also stored in the storage device 158. In certain embodiments, each of the applications may further include sub-modules. Alternatively, in certain embodiments, some or all of the application may be combined to form a single module.

The OS 170 is a collective management software application managing the operation of the remote computing device 150. For example, the OS 170 can include a set of functional programs that control and manage operations of the devices connected to the remote computing device 150. The set of application programs provide certain utility software for the user to manage the remote computing device 150. In certain embodiments, the OS 170 is operable to multitask, i.e., execute computing tasks in multiple threads. Examples of the OS 170 may be any of the commercial operating systems. For example, when the remote computing device 150 is a mobile device, the OS may be iOS, Android, Microsoft Windows 8, Blackberry OS, or any other mobile operating systems for the mobile device.

The browser application 172 is a web browser software for retrieving, presenting, and traversing information resources on the Internet. In certain embodiments, the browser application 172 functions as a web client, which is connected to the web server module 168 of the management controller 130, such that a user (e.g., an administrator of the system 100) may access the UI of the management controller 130 in order to remotely control the network switch 120. In certain embodiments, the administrator may send a request to the management controller for the web page (i.e., the UI). In response to the request, the web server module 168 may send the web page for the UI to the remote computing device 150. When the browser application 172 receives the web page, the browser application may present the UI on a display device of the remote computing device 150, such that the administrator may operate the UI to upload the parsed information of the MIB file, or to send an input to the management controller through the UI.

In certain embodiments, the browser application 172 is configured to upload the parsed information of the MIB file to the management controller using a jQuery Ajax function. The jQuery library is a cross-platform JavaScript library designed to simplify the client-side scripting of HTML. In the jQuery library, Ajax (which is an abbreviation for asynchronous JavaScript and XML) is a set of web development techniques using many web technologies on the client-side to create asynchronous Web applications. With Ajax, web applications such as the browser application 172 can send data to and retrieve from a server asynchronously (in the background) without interfering with the display and behavior of the existing page. By decoupling the data interchange layer from the presentation layer, Ajax allows for web pages, and by extension web applications, to change content dynamically without the need to reload the entire page. Despite the name, the use of XML is not required (JSON is often used in the AJAJ variant), and the requests do not need to be asynchronous.

The parser application 174 is an application to parse the MIB file 176 in order to obtain the parsed information of the MIB file. As described above, the MIB file 176 may include a plurality of OIDs, and the parsed information of the MIB file may include a plurality of JSON objects. In certain embodiments, the parser application 174 may parse the MIB file 176 to retrieve the OIDs from the MIB file, and then convert the OIDs to the JSON objects in order to generate the parsed information of the MIB file.

In certain embodiments, the parser application 174 may be used to parse more than one MIB file 176. For example, the system 100 may include multiple network switches 120, and each of the network switches 120 may have a corresponding MIB file. Thus, the parser application 174 may be used to parse each of the MIB files separately. Further, in certain embodiments, each MIB file corresponding to one network switch 120 may have supported MIB files, and the parser application 174 may be used to parse these supported MIB files too.

In certain embodiments, to avoid the wrong value problem in the MIB2JSON library, the parser application 174 may process the OIDs by splitting the OID values till the last digit of the OID from the MIB file. In this case, the wrong value problem may be rectified.

It should be noted that the proposed solution to use the parser application 174 to parse the MIB file at the remote computing device 150 is applicable for all network switches, regardless of the different devices manufactured by different vendors and the different versions of the SNMP protocol. For example, the parser application 174 may be used to read the MIB files under the SNMP version 1, version 2 or version 3 protocols.

Figure 4:
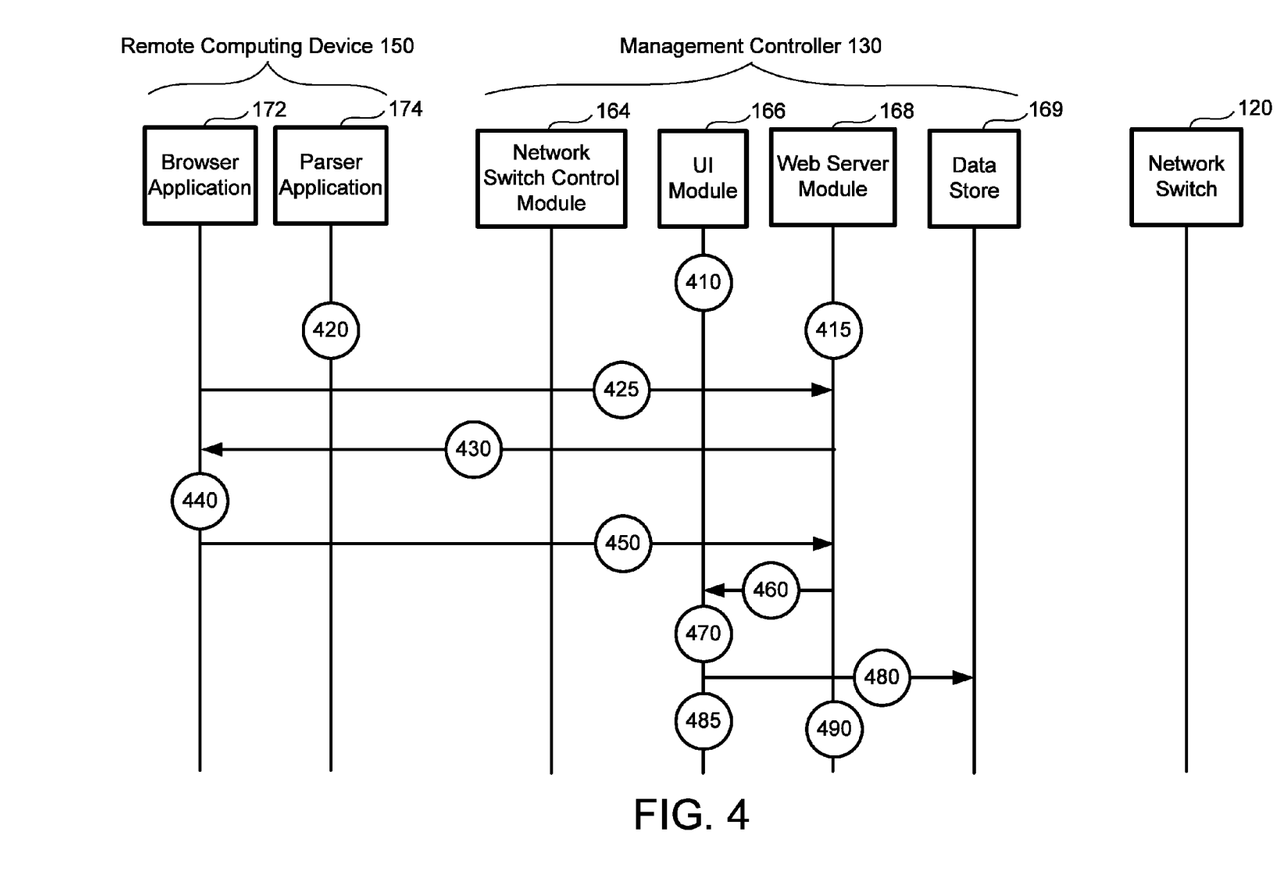
FIG. 4 depicts a flowchart showing a method for uploading the parsed information of the MIB file to the management controller of the system according to certain embodiments of the present disclosure.

FIG. 4 depicts a flowchart showing a method for uploading the parsed information of the MIB file to the management controller of the system according to certain embodiments of the present disclosure. In certain embodiments, the method as shown in FIG. 4 may be implemented on a system as shown in FIGS. 1-3. It should be particularly noted that, unless otherwise stated in the present disclosure, the steps of the method may be arranged in a different sequential order, and are thus not limited to the sequential order as shown in FIG. 4.

As shown in FIG. 4, at the management controller 130, at procedure 410, the UI module 166 is executed to provide a UI. Then, at procedure 415, the web server module 168 may create a web page for the UI to be accessible for the remote computing device 150 through the network 140. At the remote computing device 150, at procedure 420, an administrator may operate the parser application 174 to generate the parsed information of the MIB file. In certain embodiments, the parsed information of the MIB file may include a plurality of JSON objects, which include human-readable text messages. In certain embodiments, the parser application 174 may parse the MIB file 176 to retrieve the OIDs from the MIB file, and then convert the OIDs to the JSON objects in order to generate the parsed information of the MIB file. It should be noted that the procedure 420 at the remote computing device 150 is performed independently and separately from the procedures 410 and 415 at the management controller 130. Thus, the procedure 420 may be performed prior to, after, or simultaneously with the procedures 410 and 415.

Once the parsed information of the MIB file is ready, at procedure 425, the administrator may use the browser application 172 to send a request to the management controller 130 in order to access the web page of the UI at the management controller 130. In response to the request, at procedure 430, the web server module 168 sends the web page for the UI being requested to the remote computing device 150, such that the UI is displayable at the remote computing device 150. Upon receiving the web page, at procedure 440, the browser application 172 displays the web page, such that the administrator may operate the UI. At procedure 450, the administrator may upload the parsed information of the MIB file to the management controller 130. In certain embodiments, the browser application 172 is configured to upload the parsed information of the MIB file to the management controller using the jQuery Ajax function.

Once the web server module 168 receives the uploaded parsed information of the MIB file, at procedure 460, the web server module 168 forwards the parsed information of the MIB file to the UI module 166. At procedure 470, the UI module 166 processes the parsed information of the MIB file received. In certain embodiments, the UI module 166 is configured to process the parsed information of the MIB file by converting the JSON objects to a plurality of UI display options by arranging the JSON objects in a hierarchical format. At procedure 480, the UI module 166 may then store the processed parsed information of the MIB file (i.e., the converted UI display options arranged in the hierarchical format) in the data store 169. In this way, the converted UI display options are displayable by the UI in the hierarchical organization without the need of further processing. Since the MIB file corresponds to the network switch 120, the processed parsed information of the MIB file in the data store 169 may become a part of the configuration data of the network switch 120. Thus, the configuration data of the network switch 120 is created in the data store 169.

At procedure 485, the UI module 166 may utilize the processed parsed information of the MIB file (i.e., the converted UI display options arranged in the hierarchical format) to update the UI, in order to provide the UI display options arranged in the UI in the hierarchical organization (or a tree view), such that the administrator may choose from one of the options of the parsed information of the MIB file to generate a corresponding input for managing the network switch 120. At procedure 490, the web server module 168 updates the web page based on the updated UI.

It should be noted that once the parsed information of the MIB file is uploaded to the management controller 130 and stored in the data store 169, the management controller 130 maintains the parsed information of the MIB file. Thus, even if the management controller 130 is restarted, the UI module 166 may load the parsed information of the MIB file from the data store 169, and re-create the UI.

As described above, the information of the MIB file (or MIB files) may be retrieved and converted from OIDs to JSON objects at the remote computing device 150, and then uploaded to the management controller 130. When additional supported MIB files exists, the uploaded information of the MIB files will be read one by one at the management controller 130 and stored as JSON objects in a hierarchical organization. The JSON objects stored in the management controller 130 may then be used to display in the web UI in a tree structure, such that the administrator may use the web UI to input commands to manage, configure and control the network switch 120.

Figure 5:
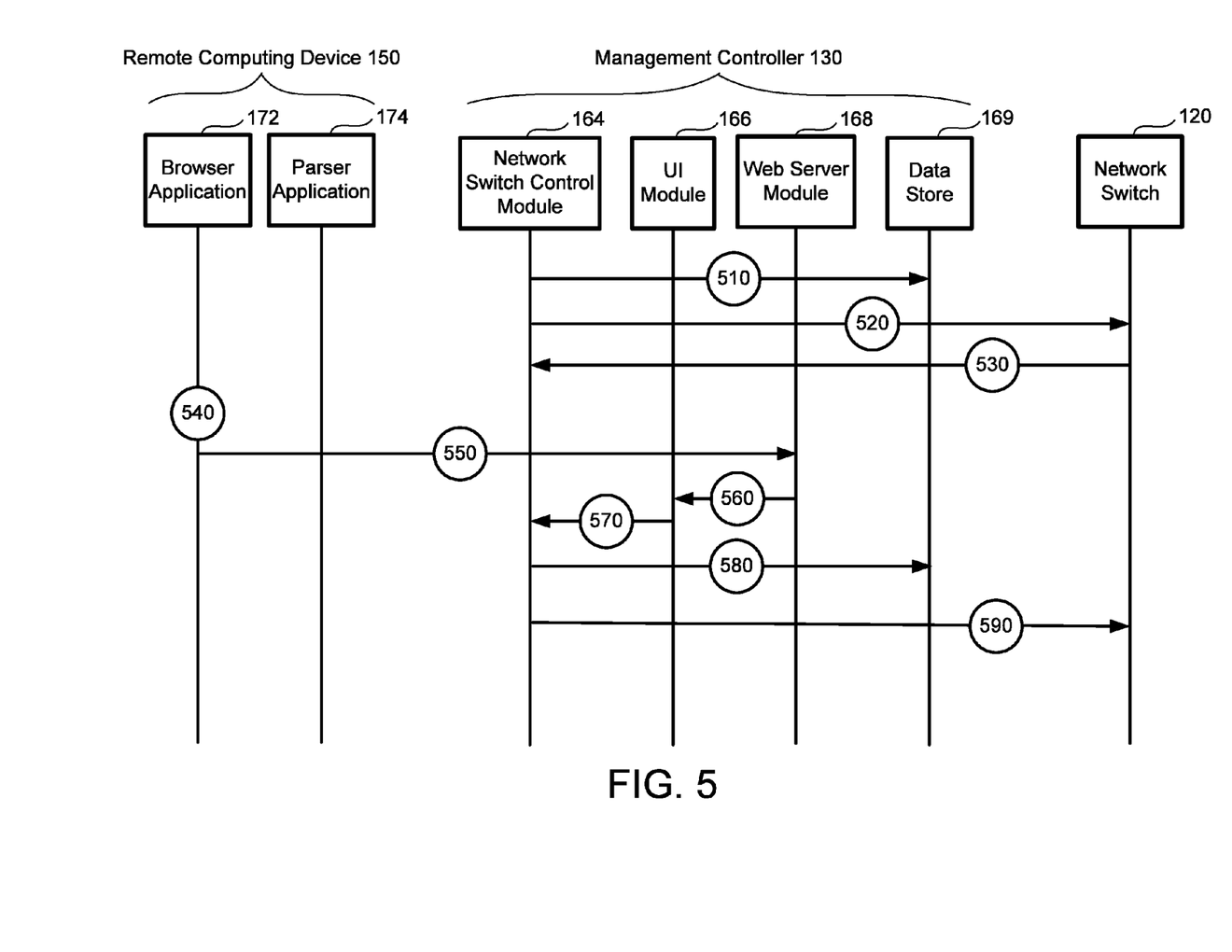
FIG. 5 depicts a flowchart showing a method for managing the network switch by the management controller of the system according to certain embodiments of the present disclosure.

FIG. 5 depicts a flowchart showing a method for managing the network switch by the management controller of the system according to certain embodiments of the present disclosure. In certain embodiments, the method as shown in FIG. 5 may be implemented on a system as shown in FIGS. 1-3. Specifically, the method as shown in FIG. 5 is performed after the parsed information of the MIB file is uploaded to the management controller 130. It should be particularly noted that, unless otherwise stated in the present disclosure, the steps of the method may be arranged in a different sequential order, and are thus not limited to the sequential order as shown in FIG. 5.

At procedure 510, the network switch control module 164 may retrieve the configuration data of the network switch 120 from the data store 169. Based on the configuration data of the network switch 120, at procedure 515, the network switch control module 164 may establish a client-server communication with the network switch 120 through the SNMP interface, in which the management controller 130 functions as the client, and the network switch 120 functions as the server. At procedure 520, the network switch 120 returns a confirmation message to the network switch control module 164 to indicate that the communication is established.

Meanwhile, at the remote computing device 150, at procedure 540, the administrator may operate the browser application 172 to choose from the options displayed on the UI to generate an input, which may be used to configure the network switch 120 or to manage certain features of the network switch 120. Specifically, the options displayed on the UI are provided based on the parsed information of the MIB file. At procedure 550, the browser application 172 sends the input to the management controller 130. Upon receiving the input, at procedure 560, the web server module 168 passes the input to the UI module 166. At procedure 570, the UI module 166 then forwards the input to the network switch control module 164. At procedure 580, the network switch control module 164 may update the configuration data of the network switch 120 in the data store 169 based on the input. Alternatively, at procedure 590, the network switch control module 164 may generate a corresponding command for managing the network switch 120 based on the input, and then send the command to the network switch 120 through the communication channel via the SNMP interface.

Figure 6:
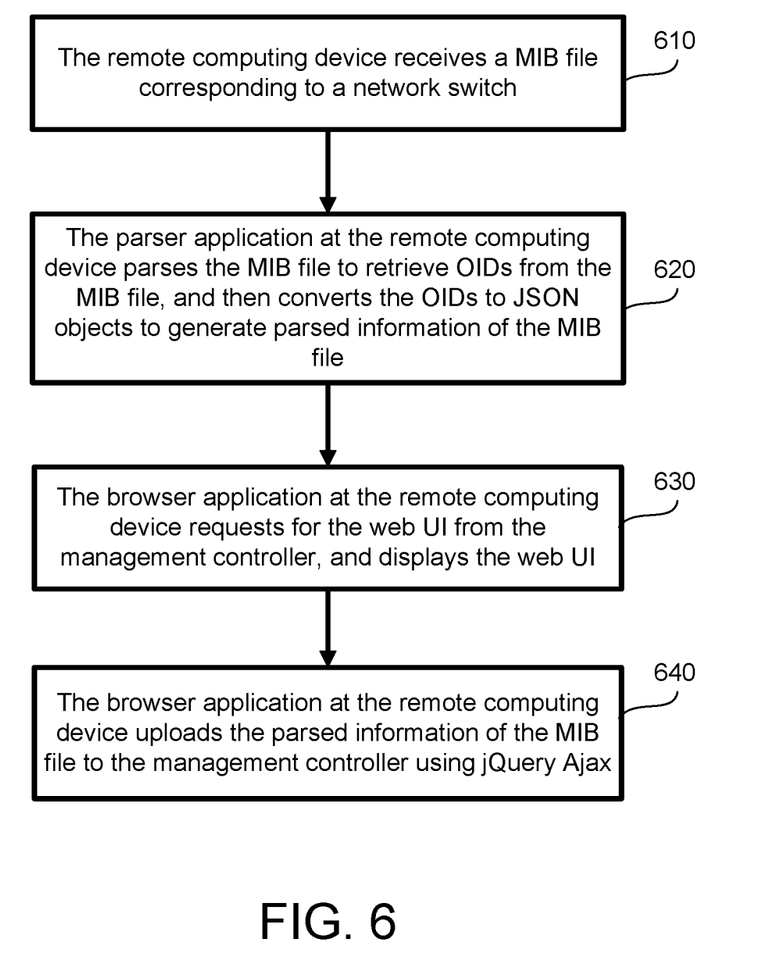
FIG. 6 depicts a flowchart showing a method for network switch management via a management controller using a MIB to JSON parser at a remote computing device according to certain embodiments of the present disclosure.

A further aspect of the present disclosure is directed to a method for device or vendor independent network switch management on a management controller. FIG. 6 depicts a flowchart showing a method for network switch management via a management controller using a MIB to JSON parser at a remote computing device according to certain embodiments of the present disclosure. In certain embodiments, the method as shown in FIG. 6 may be implemented on the system 100 as shown in FIG. 1, and specifically on the remote computing device 150 as shown in FIG. 3. It should be particularly noted that, unless otherwise stated in the present disclosure, the steps of the method may be arranged in a different sequential order, and are thus not limited to the sequential order as shown in FIG. 6.

As shown in FIG. 6, at procedure 610, the remote computing device 150 receives a MIB file 176 corresponding to a network switch 120. In certain embodiments, when the system 100 includes multiple network switches 120, the remote computing device 150 may receive multiple MIB files corresponding to each of the network switches 120. At procedure 620, the parser application 174 at the remote computing device 150 parses the MIB file to retrieve OIDs from the MIB file, and then converts the OIDs to JSON objects to generate parsed information of the MIB file. At procedure 630, the browser application 172 at the remote computing device 150 requests for the web UI from the management controller 130, and displays the web UI, such that the administrator may operate the web UI displayed on the browser application 172 to upload the parsed information of the MIB file. At procedure 640, the browser application 172 at the remote computing device uploads the parsed information of the MIB file to the management controller 130 using jQuery Ajax, as described in the flowchart of FIG. 4. Once the parsed information of the MIB file is received and stored in the management controller 130, the management controller 130 may establish a communication between the management controller 130 and the network switch 120 through the SNMP interface based on the parsed information of the MIB file. In certain embodiments, the management controller 130 functions as a client of the communication and the network switch 120 functions as a server of the communication. In certain embodiments, the communication between the management controller 130 and the network switch 120 may be established using a SNMP client application on Linux, and the procedures to establish the communication may be as described in the flowchart of FIG. 5.

In a further aspect, the present disclosure is related to a non-transitory computer readable medium storing computer executable code. The computer executable code, when executed at one or more processor, may perform the method as described above. In certain embodiments, the non-transitory computer readable medium may include, but not limited to, any physical or virtual storage media. In certain embodiments, the non-transitory computer readable medium may be implemented as the storage device 156 of the remote computing device 150 as shown in FIG. 3.

In certain embodiments, the system and method as described above enables the administrator to use the same existing management controller stack of the management controller 130 in the system 100 to communicate, manage and/or configure the network switch 120 in the system 100. There is no need to have a different setup, or to install a SNMP client application on the remote computing device 150. Further, the remote computing device 150 is connected to the management controller 130 through the OOB network 140 using a browser based interface to perform network switch management and configuration, without any client OS dependency. The overall system management criteria may thus be simplified, with a minimal addition to the management stack of the management controller 130 adding tremendous value in terms of time and resource saving.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
a network switch having a Simple Network Management Protocol (SNMP) interface;
a management controller communicatively connected to the network switch through the SNMP interface; and
a computing device communicatively connected to the management controller through an out-of-band (OOB) network, the computing device comprising a processor and a storage device storing computer executable code, wherein the computer executable code, when executed at the processor, is configured to:
parse a management information base (MIB) file corresponding to the network switch to retrieve a plurality of Object Identifiers (OIDs) from the MIB file;
convert the OIDs to a plurality of JavaScript Object Notation (JSON) objects to generate parsed information of the MIB file comprising the JSON objects;
upload the parsed information of the MIB file to the management controller through the OOB network, wherein the management controller is configured to receive the parsed information of the MIB file, and establish a communication between the management controller and the network switch through the SNMP interface based on the parsed information of the MIB file, wherein the management controller functions as a client of the communication and the network switch functions as a server of the communication;

receive an input for managing and configuring the network switch;

send the input to the management controller through the OOB network, wherein the management controller is further configured to receive the input and manage and configure the network switch via the communication through the SNMP interface based on the input and the parsed information of the MIB file;

wherein the computer executable code comprises:

a parser application configured to:

parse the MIB file corresponding to the network switch to retrieve the OIDs from the MIB file; and convert the OIDs to the JSON objects to generate parsed information of the MIB file; and a browser application configured to:

request for a web user interface (UI) from the management controller;

receive the web UI from the management controller;

display the web UI in the browser application; and upload, through the web UI, the parsed information of the MIB file to the management controller.

2. The system as claimed in claim 1, wherein the management controller is a chassis management controller, a baseboard management controller (BMC), or a rack management controller.

3. The system as claimed in claim 1, wherein the web UI is in a HTML5 compatible format.

4. The system as claimed in claim 1, wherein the browser application is configured to upload the parsed information of the MIB file to the management controller using a jQuery Ajax function.

5. The system as claimed in claim 1, wherein the management controller is configured to:

generate the web UI;

in response to receiving the request for the web UI from the computing device, send the web UI to the computing device;

in response to receiving the parsed information of the MIB file being uploaded from the computing device, process the parsed information of the MIB file, and display, through the web UI, the processed parsed information of the MIB file in a hierarchical organization; and establish the communication between the management controller and the network switch through the SNMP interface based on the processed parsed information of the MIB file.

6. The system as claimed in claim 5, wherein the browser application is further configured to:

receive, through the web UI, the input for managing and configuring the network switch; and send the input to the management controller through the OOB network.

7. The system as claimed in claim 6, wherein the management controller is further configured to:

receive the input from the computing device through the OOB network; and manage and configure the network switch via the communication through the SNMP interface based on the input and the parsed information of the MIB file.

8. A method for network switch management via a management controller using a management information base (MIB) to JavaScript Object Notation (JSON) parser, the method comprising:

receiving, at a computing device, a MIB file corresponding to a network switch having a Simple Network Management Protocol (SNMP) interface, wherein the management controller is communicatively connected to the network switch through the SNMP interface, and the computing device is communicatively connected to the management controller through an out-of-band (OOB) network;

parsing, by a parser application executed at the computing device, the MIB file to retrieve a plurality of Object Identifiers (OIDs) from the MIB file;

converting, by the parser application executed at the computing device, the OIDs to a plurality of JSON objects to generate parsed information of the MIB file comprising the JSON objects;

uploading, by the computing device, the parsed information of the MIB file to the management controller through the OOB network, wherein the management controller is configured to receive the parsed information of the MIB file, and establish a communication between the management controller and the network switch through the SNMP interface based on the parsed information of the MIB file, wherein the management controller functions as a client of the communication and the network switch functions as a server of the communication;

receiving, by the computing device, an input for managing and configuring the network switch;

sending, by the computing device, the input to the management controller through the OOB network, wherein the management controller is further configured to receive the input and manage and configure the network switch via the communication through the SNMP interface based on the input and the parsed information of the MIB file;

requesting, by a browser application executed at the computing device, for a web user interface (UI) from the management controller;

receiving, by the browser application, the web UI from the management controller; and displaying, by the browser application, the web UI in a browser application;

wherein the parsed information of the MIB file is uploaded through the web UI displayed by the browser application to the management controller.

9. The method as claimed in claim 8, wherein the management controller is a chassis management controller, a baseboard management controller (BMC), or a rack management controller.

10. The method as claimed in claim 8, wherein the web UI is in a HTML5 compatible format.

11. The method as claimed in claim 8, wherein the browser application is configured to upload the parsed information of the MIB file to the management controller using a jQuery Ajax function.

12. The method as claimed in claim 8, further comprising:

receiving, by the browser application through the web UI, the input for managing and configuring the network switch; and sending, by the browser application, the input to the management controller through the OOB network, wherein the management controller is configured to manage and configure the network switch via the communication through the SNMP interface based on the input and the parsed information of the MIB file.

13. A non-transitory computer readable medium storing computer executable code, wherein the computer executable code, when executed at a processor of a computing device, is configured to:
  parse a management information base (MIB) file corresponding to a network switch having a Simple Network Management Protocol (SNMP) interface to retrieve a plurality of Object Identifiers (OIDs) from the MIB file, wherein a management controller is communicatively connected to the network switch through the SNMP interface, and the computing device is communicatively connected to the management controller through an out-of-band (OOB) network;
  convert the OIDs to a plurality of JavaScript Object Notation (JSON) objects to generate parsed information of the MIB file comprising the JSON objects;
  upload the parsed information of the MIB file to the management controller through the OOB network, wherein the management controller is configured to receive the parsed information of the MIB file, and establish a communication between the management controller and the network switch through the SNMP interface based on the parsed information of the MIB file, wherein the management controller functions as a client of the communication and the network switch functions as a server of the communication;
  receive an input for managing and configuring the network switch;
  send the input to the management controller through the OOB network, wherein the management controller is further configured to receive the input and manage and configure the network switch via the communication through the SNMP interface based on the input and the parsed information of the MIB file;
  wherein the computer executable code comprises:
    a parser application configured to:
      parse the MIB file corresponding to the network switch to retrieve the OIDs from the MIB file; and
      convert the OIDs to the JSON objects to generate parsed information of the MIB file; and
    a browser application configured to:
      request for a web user interface (UI) from the management controller;
      receive the web UI from the management controller;
      display the web UI in a browser application; and
      upload, through the web UI, the parsed information of the MIB file to the management controller.

14. The non-transitory computer readable medium as claimed in claim 13, wherein the management controller is a chassis management controller, a baseboard management controller (BMC), or a rack management controller.

15. The non-transitory computer readable medium as claimed in claim 13, wherein the web UI is in a HTML5 compatible format.

16. The non-transitory computer readable medium as claimed in claim 13, wherein the browser application is configured to upload the parsed information of the MIB file to the management controller using a jQuery Ajax function.

17. The non-transitory computer readable medium as claimed in claim 13, wherein the browser application is further configured to:
  receive, through the web UI, the input for managing and configuring the network switch; and
  send the input to the management controller through the OOB network, wherein the management controller is configured to manage and configure the network switch via the communication through the SNMP interface based on the input and the parsed information of the MIB file.

* * * * *